United States Patent

Brown et al.

[15] 3,638,260
[45] Feb. 1, 1972

[54] FEEDER FOR SCREW BLANKS AND SERRATED WASHERS

[72] Inventors: John B. Brown; Raymond L. Alexander, both of Indianapolis, Ind.

[73] Assignee: Moorfeed Corporation, Indianapolis, Ind.

[22] Filed: Mar. 25, 1970

[21] Appl. No.: 22,635

[52] U.S. Cl. ................................................10/162, 10/155
[51] Int. Cl. ................................B21k 27/00, B23p 19/08
[58] Field of Search .....................10/27, 86, 155, 155.5, 162, 10/165, 169

[56] References Cited

UNITED STATES PATENTS

| 2,273,782 | 2/1942 | Irwin | 10/155 |
| 2,716,760 | 9/1955 | Poupitch | 10/155 |
| 3,523,316 | 8/1970 | Alexander | 10/155 |
| 3,012,258 | 12/1961 | Schott et al. | 10/155 |

FOREIGN PATENTS OR APPLICATIONS

| 916,140 | 1/1963 | Great Britain | 10/155 |

*Primary Examiner*—Charles W. Lanham
*Assistant Examiner*—E. M. Combs
*Attorney*—Hood, Gust, Irish & Lundy

[57] ABSTRACT

Vibratory track means for serially feeding washers, the track means including means providing an upwardly facing first ledge portion for supporting peripheral edge portions of the washers, an upwardly extending first wall portion extending along and bounding the first ledge portion, and an overhanging, downwardly facing portion extending outwardly from the first wall portion by an amount preferably not substantially greater than the cross-sectional width of the first ledge portion. The track means also includes means providing a second upwardly facing ledge portion for supporting the diametrically opposite peripheral edge portions of the washers and an upwardly extending second wall portion extending along and bounding the second ledge portion and facing the said first wall portion, the track means being devoid of any surface overhanging this second ledge portion.

11 Claims, 9 Drawing Figures

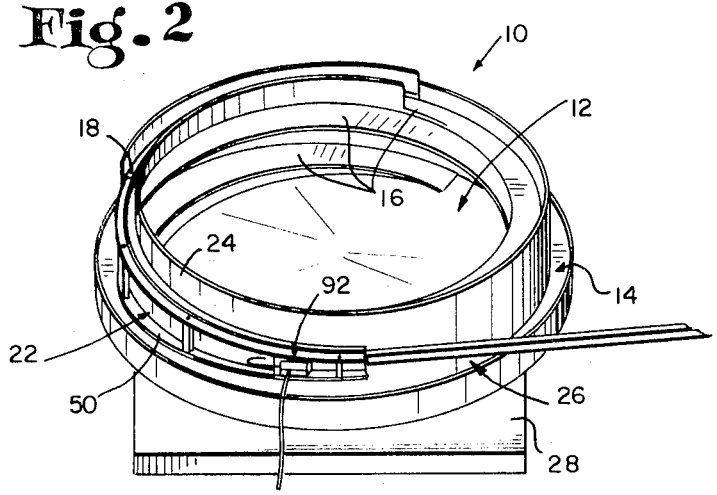
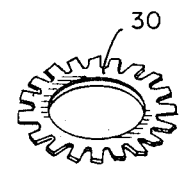
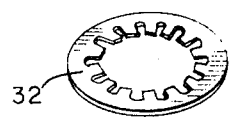
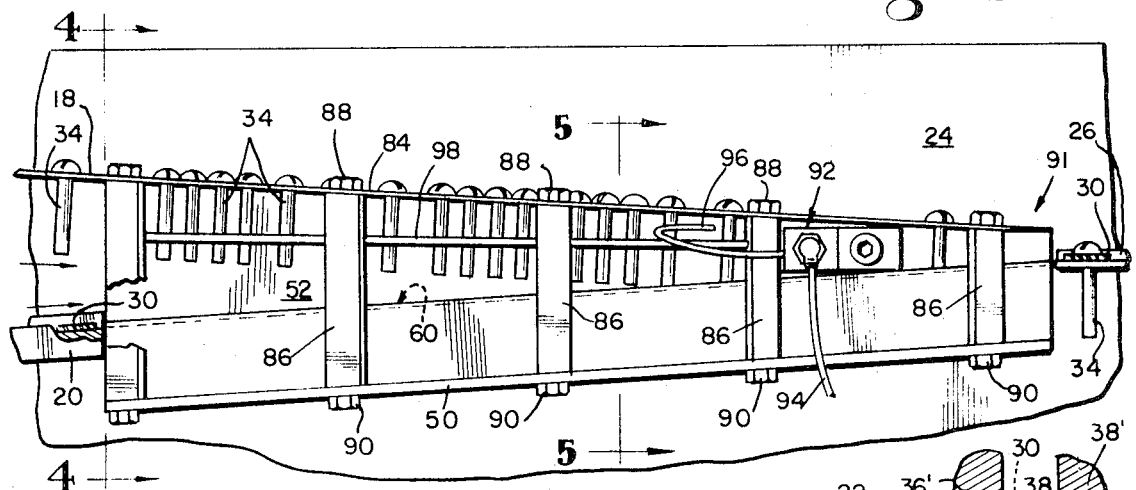
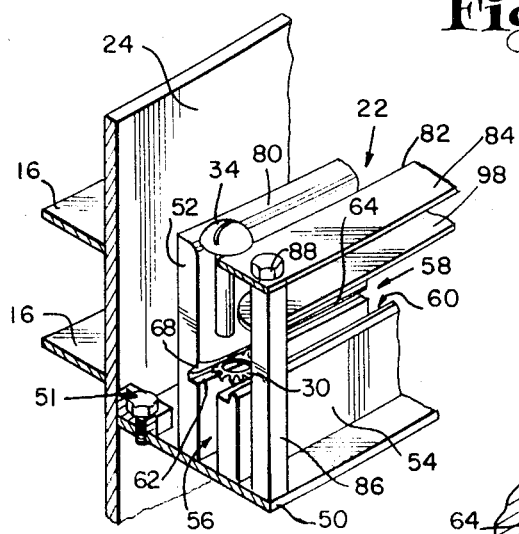
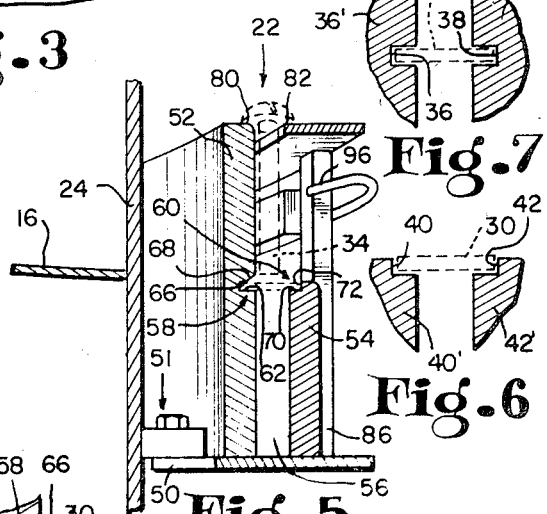
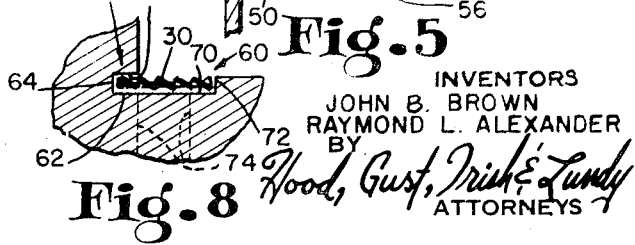
INVENTORS
JOHN B. BROWN
RAYMOND L. ALEXANDER
BY Hood, Gust, Irish & Lundy
ATTORNEYS

FEEDER FOR SCREW BLANKS AND SERRATED WASHERS

It is a primary object of our invention to provide a vibratory track means for serially feeding washers, which track means is particularly suited for feeding small, lightweight serrated washers having either internal teeth or external teeth.

Another object of our invention is to provide an assembly apparatus including a pair of vibratory track means, one of which feeds serrated washers and the other one of which feeds screw blanks to be mated with the serrated washers.

Our invention relates generally to vibratory feeders and hoppers of the type shown in the Balsiger et al., U.S. Pat. No. 2,609,914. Vibratory feeders generally include a bowl into which parts are dumped and a spiral track leading upwardly about the wall of the bowl. As the bowl is vibrated, the parts move from the bottom of the bowl onto the track and upwardly about the track. We have been constructing vibratory feeders which will feed and mate screw blanks and washers and then feed the mated screw blanks and washers to a conventional thread rolling apparatus which rolls threads on the shanks of the screw blanks to capture the washers thereon.

Our preferred vibratory feeder includes a bowl for feeding the screw blanks and an annular pan for feeding washers, the pan being concentrically disposed about the bowl and connected thereto for vibration therewith. It is our practice to bring the screw blanks along a downwardly inclining trackway, supporting the screw blanks by their heads with their shank portions hanging downwardly, and then to bring washers along an upwardly inclining trackway which is disposed just below the trackway on which the screw blanks are carried. As the screw blanks and washers move along their respective trackways which are preferably in vertical registry, the shanks of the screw blanks will engage and extend into the openings in the washers. This general concept is disclosed in the copending Raymond L. Alexander U.S. Pat. application Ser. No. 680,676 filed Nov. 6, 1967 now U.S. Pat. No. 3,523,316, issued Aug. 11, 1970.

Heretofore, it has been difficult, if not impossible, to feed very small, lightweight serrated washers serially along the trackway by vibration of the trackway. This has been especially true in the case of external tooth serrated washers. The washers are so light that they do not tend to move along a vibrating track as well as larger, heavier washers. The hesitancy of some washers to move causes engagement or meshing of the washer teeth. When the teeth mesh or engage, the washers tend to lock together and to stop movement along the track.

To our knowledge and belief, heretofore, trackways for feeding washers have been defined either by forming inwardly extending, generally rectangular grooves in the facing surfaces of members or by forming an open-topped slot in one or more members. These two types of trackways are shown in the accompanying drawings.

We believe that a washer which has an outer diameter of about one-half inch and a thickness of about 0.060 inch is considered a small, lightweight washer. Our trackway is particularly suited for an even smaller, lighter washer such as a washer having an outer diameter of five-sixteenth inch and a thickness of one thirty-second inch. It will be appreciated, however, that our trackway may be used for feeding any conventional washer.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a perspective view of a conventional external tooth serrated washer;

FIG. 1a is a perspective view of a conventional internal tooth serrated washer;

FIG. 2 is a perspective view of an assembly apparatus comprising the track means of the present invention;

FIG. 3 is an elevational view of the track means of the present invention;

FIG. 4 is an enlarged fragmentary and sectional perspective view of the entrance end portion of the track means of the present invention, this view being taken along the section line 4—4 in FIG. 3;

FIG. 5 is a fragmentary sectional view taken along the line 5—5 in FIG. 3;

FIG. 6 is a fragmentary sectional view of a prior art track way;

FIG. 7 is another fragmentary sectional view of another prior art trackway; and

FIG. 8 is an enlarged, fragmentary sectional view of a track way formed in accordance with the present invention.

Referring now to the drawings, and particularly to FIGS. 1, 1a and 2, it will be seen that we have shown a vibratory feeder 10 comprising a bowl 12 and an annular pan 14 disposed peripherally about the bowl 12 and rigidly fastened thereto for vibration therewith. Reference is made to the copending Raymond L. Alexander application Ser. No. 680,676 filed Nov. 6, 1967 now U.S. Pat. No. 3,523,316 for a disclosure of the type of feeder indicated at 10. As discussed in this copending application, screw blanks or screws are placed in the bowl 12 and washers are placed in the annular pan 14. The feeder 10 includes a spiral track 16 for conveying the screws or screw blanks upwardly from the bottom of the bowl 12 to a point indicated at 18. At this point 18, which is the exit end of the track 16, as is now well known and as is disclosed in copending application Ser. No. 680,676, now U.S. Pat. No. 3,523,316 the screws or screw blanks are suspended by their heads.

Further, the feeder 10 comprises a track which inclines upwardly about the bowl 12 from the bottom of the pan 14 to feed serially washers from the pan, the exit end of this track being indicated at 20 in FIG. 3. It will be appreciated that the exit end point 18 is just above and preferably in vertical registry with the exit end point 20.

It is an object of our invention to provide a track system or track means, indicated generally at 22, for receiving the screws or screw blanks from the exit end point 18 and the washers from the exit end point 20 and conveying these screws or screw blanks and washers to the point at which they are mated. This track system 22 is mounted on the wall 24 which is the outside wall of the bowl 12. We show a track 26 which is arranged to convey mated screws or screw blanks and washers away from the exit end of the track system 22.

The feeder 10 comprises a base 18 upon which the bowl 12 and the pan 14 as well as the track system 22 are mounted for vibration. Specifically, the bowl 12 with the pan 14 and track system 22 rigidly connected thereto is mounted upon the platform 28 by means of springs and an electromagnetic motor is provided for vibrating the bowl and pan. Such vibrator-type feeders are well known and need not be discussed, in detail, in this description. See, for instance, the Balsiger et al., U.S. Pat. No. 2,609,914 issued Sept. 9, 1952. Reference is made to this Balsiger et al., patent for a description of the manner in which the bowl 12 and the pan 14 are vibrated as well as the manner in which parts move about spirally inclined tracks.

In this description, and in the claims appended hereto, the term "screw" includes a screw blank, i.e., a blank which is fed to a thread-rolling apparatus so that a thread can be formed on its shank.

In FIG. 1, we show a conventional external tooth-serrated washer 30 and in FIG. 1a, we show a conventional internal tooth-serrated washer 32. The feeder 10 and the track means 22 are particularly suited for feeding and mating such serrated washers with screw blanks. In this description and in the drawings, the screw blanks being fed from the bowl 12 are indicated at 34 and the washers being fed from the pan 14 are indicated at 30.

Referring now to FIGS. 6 and 7, it will be seen that we have illustrated cross sections of previously used trackways for washers. In FIG. 7, we show grooves 36, 38 formed respectively in spaced apart members 36', 38' to support diametrically opposite peripheral edge portions of washers, such as indicated at 30. Such a trackway is disclosed in the aforesaid Alexander application Ser. No. 680,676 now U.S. Pat. No. 3,523,316. Specifically, the member 36' extends peripherally about a portion of a bowl, such as the bowl 12, and the member 38' extends peripherally about the member 36'. The grooves 36, 38 are formed, respectively, in the outer and inner surfaces of the members 36', 38' to provide a trackway for conveying washers 30. In FIG. 6, we show rabbets 40, 42 formed, respectively, in members 40', 42' to provide a trackway for conveying washers such as indicated at 30. Specifically, the member 40' extends peripherally about a bowl wall and the member 42' extends peripherally about the member 40'. The trackway provided by the rabbeted members 40', 42' is open at its top and the washers 30 are held downwardly therein only by gravity. In the structure of FIG. 7, it will be appreciated that the washer 30 is confined or restrained against significant movement in any direction except along the direction of the grooves 36, 38.

These previously used trackways shown in FIGS. 6 and 7 have been found to be totally inadequate for feeding small, lightweight, serrated washers. In the trackway structure of FIG. 7, the washers tend to jam together to resist movement therealong. In the structure of FIG. 6, at the slightest hesitancy in its movement, a small lightweight, serrated washer will jump up out of or climb up out of the trackway. The trackway of our present invention is designed to solve these problems.

Referring again to FIGS. 2–5, it will be seen that there is a peripherally extending platform member 50 inclining upwardly about the outer wall 24 of the bowl 12, this platform member being removably fastened to the wall 24 by fastening means such as indicated at 51. A first vertically extending member is mounted on this platform member 50 to extend peripherally about a portion of the sidewall 24 and a second vertically extending member 54 is mounted on the member 50 radially outwardly from the member 52 to extend peripherally about the same portion of the wall 24. These two members 52, 54 are spaced apart to define a space 56 which receives the shanks of the screw blanks 34. The two members 52, 54 may be welded or otherwise securely fastened to the platform member 50. We provide a groove 58 which inclines upwardly about the outer peripheral surface of the member 52 and we rabbet the upper edge of the member 54 as indicated at 60. The groove 58 and the rabbet 60 spirally incline upwardly at the same rate.

In accordance with our present invention, the groove 58 provides a first ledge portion 62 for supporting peripheral edge portions of such washers 30, an upwardly extending first wall portion 64 extending along and bounding the first ledge portion 62, and an overhanging, downwardly facing portion 66 extending outwardly from the wall portion 64 by an amount which preferably is not substantially greater than the cross-sectional width of the first ledge portion 62. For instance, we believe that the portion 66 should not extend outwardly to the point at which it will overlie a significant portion of the opening in a washer carried in the trackway provided by the groove 58 and rabbet 60. The reason for this will become apparent as the description proceeds to the discussion of mating screw blanks with washers. The entrance end of this groove 58 is beveled as indicated at 68 to provide a sort of guiding surface which inclines upwardly relative to the first ledge portion 62. That is, as washers 30 leave the exit end 20, the beveled surface 68 tends to guide a peripheral edge portion of the washer into the groove 58.

The rabbet 60 in the member 54 provides a second upwardly facing ledge portion 70 for supporting the diametrically opposite peripheral edge portions of such washers 30, this second ledge portion extending alongside the first ledge portion 62, and an upwardly extending second wall portion 72 extending along and bounding the second ledge portion 70 and facing the said first wall portion 64. Now, it will be appreciated that the trackway provided by the groove 58 and the rabbet 60 is devoid of any surface overhanging the said second ledge portion 70. In other words, there is an overhanging portion 66 in vertical registry with the first ledge portion 62 but there is no such overhanging portion in vertical registry with the second ledge portion 70. The differences between the trackway structure of our present invention and the prior trackway structures of FIGS. 6 and 7 will, therefore, be apparent.

In FIG. 8, which is slightly enlarged, we show the first ledge portion 62, first wall portion 64, overhanging portion 66, second ledge portion 70 and second wall portion 72 formed in a single member and indicate, by means of dashed lines 74, that the surfaces which engage the diametrically opposite peripheral edge portions of a washer 30 may be formed in a single member so that the first ledge portion 62 and second ledge portion 70 are in effect the same surface formed in the member. Thus, in this description and in the claims appended hereto, the first and second ledge portions 62, 70 may be portions of the same surface in the same member or they may be, as shown in FIGS. 2–5, surfaces formed in adjacent members with a space therebetween. It will be appreciated that the space between the ledge surfaces is required to receive the shanks of screw blanks which are mated with the washers riding thereon. The dashed lines 74 represent such a space which may start at any point along the trackway provided by the groove 58 and rabbet 60.

The upper, outer edge of the member 52 provides a third ledge portion 80 for supporting peripheral edge portions of the heads of the screw blanks 34, this third ledge portion being disposed above and in vertical registry with the first ledge portion 62. The diametrically opposite peripheral edge portions of the heads of the screws 34 are supported by a fourth ledge portion 82 which is provided by a flat metal strip 84 extending alongside the ledge portion 80. This fourth ledge portion 82 is disposed above and in vertical registry with the second ledge portion 70. The strip 84 is supported by means of vertically extending posts 86, the strip being fastened to the posts by fastening means such as indicated at 88 and the posts being fastened to the platform member 50 by fastening means such as indicated at 90.

Thus, the screw blanks 34 are conveyed along the upper track means defined by the ledge portions 80, 82 and the washers 30 are conveyed along a lower track means defined by the ledge portions 62, 70. As viewed in FIG. 3, it will be appreciated that the upper ledge portions 80, 82 incline downwardly relative to the lower ledge portions 62, 70 so that the shanks of the screw blanks 34 moving along the upper ledge portions will engage and extend through the openings in the washers 30 moving along the lower ledge portions. That is, the screw blanks are fed serially at generally a constant rate and the washers 30 are fed serially at generally a constant rate so that the shank portions of the screw blanks will engage and extend through the washers moving therebelow. The exit end of the upper track means, i.e., upper ledge portions 80, 82, indicated at 91 is the point at which the screw blanks will drop into full engagement with their mating washers. That is, at this exit end point 91, the heads of the screw blanks are no longer supported so that the screw blank drops downwardly. The track 26, which receives mated screw blanks and washers from the exit end of the track system 22, is arranged to support the diametrically opposite edge portions of the washers leaving the trackway provided by the groove 58 and rabbet 60. Since each screw blank 34 is engaged with a washer 30 with its head resting on the upper surface of the washer, the mated screw blanks and washers are carried on and along the track 26.

The exit end portion of the strip member 84 is sharpened as indicated at 91 so that this member 84 can be used with shorter posts 86 and a different member 52 to mate extremely short screw blanks 34 with washers 30. That is, in some cases, the member 84 may be positioned so that its exit end 91 is just, for instance, one-eighth of an inch above the second ledge portion 70 disposed therebelow.

We show an air jet means 92 disposed on the track system 22 and arranged to facilitate the mating of screw blanks and washers and the moving of such mated screw blanks and washers. The jet means 92 includes an air input line 94 and a jet line 96 arranged to direct a jet of air downstream, i.e., in the direction of movement of the screw blanks 34 and washers 30, at such screw blanks and washers after they are engaged. Specifically, we prefer that the jet line 96 be positioned to direct a jet of air at the shank portions of screw blanks which have just entered the opening in a washer. This blast of air provided by the jet line 96 rapidly moves the screw blank and the washer through which its shank extends to the right as viewed in FIG. 3 to clear the trackway so that another screw blank can engage and extend into another washer. This movement by the jet of air is in addition to the movement provided by the vibratory motion of the track system 22.

In the illustrative embodiment, we show a guide member 98 which is mounted on the posts 86 to be under the strip member 84. The radially inner edge of this peripherally extending member 98 acts as a guide for the shank portions of the screw blanks 34 to keep the shank portions directed downwardly toward the washers moving therebelow.

The dimensions of each trackway provided by a groove 58 and rabbet 60 will depend, of course, on the dimensions of the washer to be carried along the trackway. We offer the following formulas as guidelines for constructing trackways, assuming that:

OD=Outer diameter of washer;
ID=Internal diameter of washer;
T=Thickness of washer;
W=Width of trackway or distance between 64 and 72;
D=Depth of trackway or height of walls 64 and 72; and
L=Cross-sectional width of ledge portions 62 and 70 and overhang 66.

Then:
$W = OD + 0.020$ to $0.030$ inch;
$D = T + 10-60\% \, T$; and
$L = \frac{1}{2}(OD - ID)$ While $D$ is shown above as being calculated on the basis of adding to the thickness $T$ of the washer a percentage of $T$ ranging from 10 to 60 percent, we have found that, in most cases, $D$ will be equal to $T + 20-50\% \, T$. This will vary of course with the type of washer being fed.

What is claimed is:

1. Vibratory track means for serially feeding washers longitudinally therealong by vibratory movement, said track means including means providing an upwardly facing first ledge portion extending therealong for supporting peripheral edge portions of such washers, an upwardly extending first wall portion extending along and bounding said first ledge portion, an overhanging, downwardly facing portion extending outwardly from and along said first wall portion by an amount not substantially greater than the cross-sectional width of said first ledge portion, a second upwardly facing ledge portion for supporting the diametrically opposite peripheral edge portions of such washers, said second ledge portion extending longitudinally alongside said first ledge portion, and an upwardly extending second wall portion extending along and bounding said second ledge portion and facing said first wall portion, said track means being devoid of any surface overhanging said second ledge portion.

2. The invention of claim 1 in which the ledge portions are spaced apart by an amount substantially equal to or greater than the internal diameter of such washers and less than the outer diameter of such washers.

3. The invention of claim 1 in which the distance between said first ledge portion and said overhanging, downwardly facing portion is from 10 to 60 percent greater than the thickness of such washers and in which the cross-sectional width of said first ledge portion and said overhanging portion is less than one-half the difference between the outer diameter and the internal diameter of such washers.

4. The invention of claim 3 in which the ledge portions are spaced apart by a distance greater than the internal diameter of such washers and less than the outer diameter of such washers.

5. The invention of claim 4 in which the height of said second wall portion is from 10 to 60 percent greater than the thickness of such washers.

6. The invention of claim 3 in which said track means is provided with an entrance end to which such washers are fed and in which said overhanging, downwardly facing portion is provided, at said entrance end, with a beveled surface inclining upwardly away from said first ledge portion.

7. The invention of claim 1 including an upper track means for serially feeding screws for mating with such washers, said upper track means including an exit end portion disposed above and in vertical registry with a portion of said first mentioned track means, said exit end portion including a third ledge portion for supporting peripheral edge portions of the heads of such screws and a fourth ledge portion for supporting the diametrically opposite peripheral edge portions of the heads of such screws, said third ledge portion being disposed above and in vertical registry with said first ledge portion and said fourth ledge portion being disposed above and in vertical registry with said second ledge portion, said third and fourth ledge portions being spaced apart to receive therebetween the downwardly extending shanks of such screws, and said third and fourth ledge portions inclining downwardly relative to said first and second ledge portions so that the shanks of such screws moving along said third and fourth ledge portions will engage and extend through the openings in such washers moving along said first and second ledge portions.

8. The invention of claim 7 in which said means providing said first ledge portion, first wall portion and said overhanging, downwardly facing portion includes a member formed with an elongated, generally rectangularly shaped groove in an upwardly extending surface thereof, the lower surface of said groove providing said first ledge portion, the bottom of said groove providing said first wall portion and the upper surface of said groove providing said downwardly facing portion.

9. The invention of claim 8 in which said member is formed with an upper edge inclining downwardly toward said groove to provide said third ledge portion.

10. The invention of claim 9 including a vibratory feeder bowl for feeding such screws and an annular pan for feeding such washers, said pan being disposed peripherally about said bowl and rigidly connected thereto for vibration therewith, said member being formed about a generally vertical axis coinciding generally with the axis of said bowl, said member being mounted to extend about the periphery of said bowl and above said pan with said groove formed in the outer periphery of said member, and in which said upper track means includes a strip extending peripherally about said bowl and inclining downwardly to provide said fourth ledge portion, and means for mounting said strip.

11. The invention of claim 7 including air jet means disposed adjacent to said exit end portion and arranged to direct a jet of air downstream at such screws and washers after they are engaged.

* * * * *